(12) United States Patent
Kim et al.

(10) Patent No.: US 7,369,467 B2
(45) Date of Patent: May 6, 2008

(54) OPTICAL PICKUP INCLUDING POLARIZATION HOLOGRAPHIC OPTICAL ELEMENT AND PHOTODETECTOR

(75) Inventors: Bong-Gi Kim, Suwon-si (KR); Soo-Han Park, Yongin-si (KR); Jung-Gug Pae, Suwon-si (KR); Tae-Youn Heor, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 562 days.

(21) Appl. No.: 10/998,570

(22) Filed: Nov. 30, 2004

(65) Prior Publication Data

US 2005/0094510 A1 May 5, 2005

(51) Int. Cl.
G11B 7/00 (2006.01)
(52) U.S. Cl. ............................. 369/44.37; 369/112.19; 369/112.1
(58) Field of Classification Search ..................... None
See application file for complete search history.

(56) References Cited

U.S. PATENT DOCUMENTS

| | | | | |
|---|---|---|---|---|
| 5,627,812 A * | 5/1997 | Yamamoto et al. | .... | 369/112.04 |
| 5,648,950 A * | 7/1997 | Takeda et al. | ......... | 369/110.03 |
| 5,717,675 A | 2/1998 | Yamamoto | .................. | 369/110 |
| 5,859,819 A * | 1/1999 | Miyabe et al. | ............ | 369/44.41 |
| 6,707,773 B2 * | 3/2004 | Katayama | ................. | 369/53.19 |

2002/0159378 A1* 10/2002 Lee et al. .............. 369/112.12

FOREIGN PATENT DOCUMENTS

| | | |
|---|---|---|
| JP | 07-050030 | 2/1995 |
| JP | 08-077578 | 3/1996 |
| JP | 09-063141 | 3/1997 |
| JP | 10-302294 | 11/1998 |
| JP | 2001-006188 | 1/2001 |
| JP | 2002-123967 | 4/2002 |
| JP | 2003-099977 | 4/2003 |
| KR | 1998-0022577 | 7/1998 |

OTHER PUBLICATIONS

Machine translation of Iwasaki et al. (JP 2003-099977).*

* cited by examiner

*Primary Examiner*—William Korzuch
*Assistant Examiner*—Peter Vincent Agustin
(74) *Attorney, Agent, or Firm*—Roylance, Abrams, Berdo & Goodman, LLP

(57) ABSTRACT

Disclosed is an optical pickup including a polarization holographic optical element (HOE) and a photodetector. The optical pickup includes a light source, an optical path changer, an objective lens, a polarization HOE, and a photodetector. The polarization HOE has a pattern designed to generate different astigmatisms in the left and right halves of the polarization HOE in a tangential direction and to divide plus and minus first-order beams in a radial direction. The photodetector includes a first light-receiving portion receiving a zero-order beam and second and third light-receiving portion that are disposed on either side of the first light-receiving portion in the tangential direction and respectively receive the plus and minus first-order beams.

11 Claims, 3 Drawing Sheets

OPTICAL PICKUP INCLUDING POLARIZATION HOLOGRAPHIC OPTICAL ELEMENT AND PHOTODETECTOR

CROSS-REFERENCE TO RELATED APPLICATION

The present application is related to Korean Patent Application No. 2003-35298, filed on Jun. 2, 2003 in the Korean Intellectual Property Office, the entire contents of which are incorporated herein by reference.

BACKGROUND OF THE INVENTION

1. Field of the Invention

The present invention relates to an optical pickup including a polarization holographic optical element (HOE) and a photodetector. More particularly, the present invention relates to an optical pickup including a polarization HOE designed to effectively split light and a photodetector with a reduced number of sections to receive light transmitted through the polarization HOE.

2. Description of the Related Art

In conventional photodetectors and HOEs with complicated configurations and patterns, it is difficult to control a pickup and lower optical efficiency results from the splitting of light. A conventional optical pickup is disclosed in U.S. Patent Publication No. 2002/0159378 A1, the entire contents of which are incorporated herein by reference, and includes a polarization HOE that transmits a transversely polarized beam and splits a horizontally polarized beam into beams that are then diffracted, and a photodetector including two light-receiving portions that are split into four quadrants and two halves, respectively, and receive plus first-order diffracted beams and the other two light-receiving portions that are composed of eight sections and a single section, respectively, and receive minus first-order diffracted beams. The polarization HOE splits plus and minus first-order and zero-order diffracted beams in the ratio of 99:1. The photodetector then receives the plus and minus first-order diffracted beams to control a focusing error servo, a tracking error servo, and a tilt error servo.

Marks are created along grooves when recording a DVD-RW while marks are created along both grooves and the areas between the grooves when recording a DVD-RAM. Due to the structural difference between DVD-RW and DVD-RAM, an optical pickup in an optical recording and/or reproducing apparatus compatible with both DVD-RAM and DVD-RW discs typically employs a photodetector with a complicated configuration.

In particular, since the temperature rises above 70° C. due to heat generated by the light source and other optical elements during recording, the optical pickup performs recording at an extremely high temperature. The heat can adversely affect the ability of an optical pickup in sultry weather.

In particular, the optical length of an optical system changes and optical components suffer deviations from their normal positions under high temperature conditions. Since an optical pickup requires a larger number of optical components for recording than for reproducing, greater deviations between optical components can be tolerated. Since optical elements in an optical pickup are bonded using an ultraviolet (UV) curing adhesive, the bonded portions suffer misalignment or expansion at high temperatures, which causes a beam transmitted or reflected by the optical elements to deviate from its intended path or a focal point of the optical beam to become out of focus. This may degrade jitter characteristics. Jitter refers to an increase in the deviation of a signal detected by a photodetector caused by defects in the marks written to an optical disc or the asymmetric shape of a beam spot created on the optical disc.

To eliminate these drawbacks, there is a need for an optical pickup with a reduced number of optical elements and bonded portions as well as a simplified structure.

SUMMARY OF THE INVENTION

The present invention provides an optical pickup that comprises a simple polarization holographic optical element (HOE) and a photodetector used to record and/or reproduce information to and/or from an optical disc.

According to an aspect of the present invention, there is provided an optical pickup that performs recording on and/or reproducing from an optical disc having lands and grooves in which information can be recorded to and/or reproduced from. The optical pickupcomprises a light source; an optical path changer causing a beam emitted by the light source to propagate toward the optical disc; an objective lens focusing the beam incident from the optical path changer onto the optical disc; a polarization HOE splitting the beam reflected from the optical disc into diffracted beams; and a photodetector, which photoelectrically converts the diffracted beams. The polarization HOE has a pattern designed to generate different astigmatisms in the left and right halves of the polarization HOE in a tangential direction and to divide plus and minus first-order beams in a radial direction. The photodetector includes a first light-receiving portion receiving a zero-order beam and second and third light-receiving portions that are disposed on either side of the first light-receiving portion in the tangential direction and respectively receive the plus and minus first-order beams. The first through third light-receiving portions are arranged in the tracking direction.

The polarization HOE has a bilaterally symmetrical oblique pattern. Each of the first through third light-receiving portions is divided into four (2 by 2) sections.

A tracking error signal is detected by photoelectrically converting a beam reflected from the optical disc and taking the difference between the sum of signals representing beams incident on two of the sections disposed on one side of the first light-receiving portion in the radial direction and the sum of signals representing beams incident on two of the sections disposed on the other side of the first light-receiving portion.

A focusing error signal is detected by photoelectrically converting a beam reflected from the optical disc and taking the difference between the sum of signals representing beams incident on two of the sections disposed on one side of the second light-receiving portion in a radial direction and the sum of signals representing beams incident on two of the sections disposed on the other side of the second light-receiving portion.

Alternatively, the focusing error signal may be detected by photoelectrically converting a beam reflected from marks formed on the optical disc and taking the difference between the sum of signals representing beams incident on two of the sections disposed on one side of the third light-receiving portion in a radial direction and the sum of signals representing beams incident on two of the sections disposed on the other side of the third light-receiving portion. The focusing error signal may be detected by photoelectrically converting a beam reflected from the optical disc. The focusing error signal is determined by taking the difference between the sum of signals representing beams incident on two of the sections on one side of each of the second and third light-receiving portions in a tangential direction, and the sum of signals representing beams incident on the sections on the other side of each of the second and third light-receiving portions.

A tilt error signal is detected by photoelectrically converting a beam reflected from lands or grooves formed on the optical disc. The tilt error signal is determined by taking the difference between the sum of signals representing beams incident on two of the sections disposed on one side of the first light-receiving portion in the radial direction and the sum of signals representing beams incident of two of the sections disposed on the other side of the first light-receiving portion. Alternatively, the tilt error signal may be detected by photoelectrically converting a beam reflected from lands or grooves formed on the optical disc. The focusing error signal is determined by taking the difference between the sum of signals representing beams incident on two of the sections disposed on one side of the second light-receiving portion in the radial direction and the sum of signals representing beams incident on two of the sections disposed on the other side of the second light-receiving portion.

When detected photoelectrically, the tilt error signal may also be determined by taking the difference between the sum of signals representing beams incident on two of the sections disposed on one side of the third light-receiving portion in the radial direction and the sum of signals representing beams incident on two of the sections disposed on the other side of the third light-receiving portion. Alternatively, the tilt error signal may be determined by taking the difference between the sum of signals representing beams incident on two of the sections on one side of each of the second and third light-receiving portions in the radial direction, and the sum of signals representing beams incident on the sections on the other side of each of the second and third light-receiving portions. A further alternative is to calculate the tilt error signal by taking the difference between the sum of signals representing beams incident on two of the sections on one side of each of the first through third light-receiving portions in the radial direction, and the sum of signals representing beams incident on the two sections on the other side of each of the first through third light receiving portions.

BRIEF DESCRIPTION OF THE DRAWINGS

The above and other features and advantages of the present invention will become more apparent by describing in detail exemplary embodiments thereof with reference to the attached drawings in which.

Throughout the drawings, like reference numbers are used to refer to like features, elements, and structures.

DETAILED DESCRIPTION OF THE EXEMPLARY EMBODIMENTS

Figure 1:
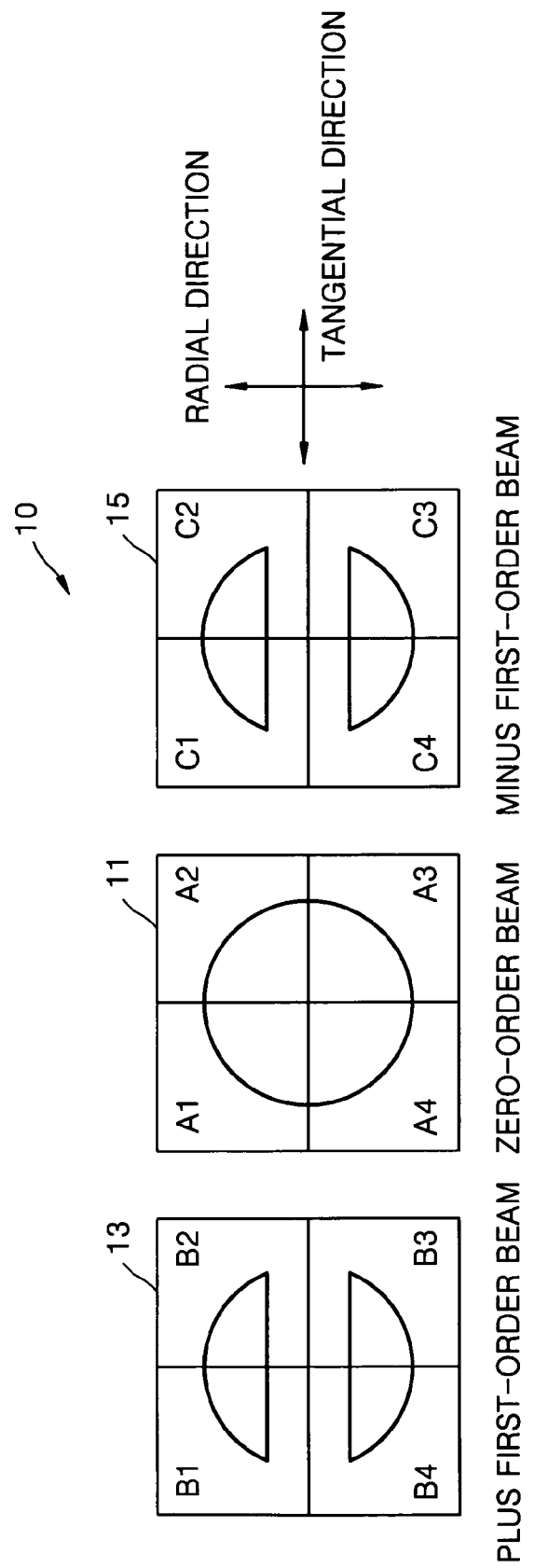
FIG. 1 is a schematic plan view of a photodetector according to an embodiment of the present invention.

Referring to FIG. 1, a photodetector 10 according to an embodiment of the present invention includes a first light-receiving portion 11 divided into four (2 by 2) quadrants A1 through A4, a second light-receiving portion 13 divided into four (2 by 2) quadrants B1 through B4, and a third light-receiving portion 15 divided into four (2 by 2) quadrants C1 through C4. The second and third light-receiving portions 13 and 15 are symmetrically disposed on either side of the first light-receiving portion 11 in a tangential direction. The first through third light receiving portions 11, 13, and 15 receive zero-order, plus first-order, and minus first-order beams, respectively. While the zero-order beam is circular, each of the plus and minus first-order beams is separated into two parts in the radial direction. That is, the plus first-order beam is separated and focused onto the upper two quadrants B1 and B2 and the lower two quadrants B3 and B4 of the second light-receiving portion 13. Similarly, the minus first-order beam is separated and focused onto the upper two quadrants C1 and C2 and the lower two quadrants C3 and C4 of the third light-receiving portion 15.

Figure 2:
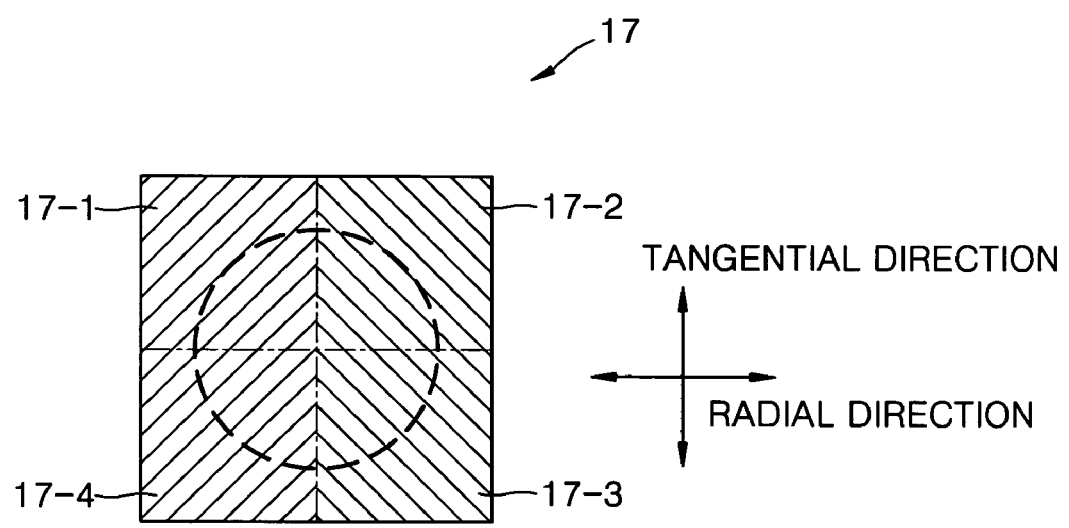
FIG. 2 is a schematic plan view of a polarization holographic optical element (HOE) according to an embodiment of the present invention.

FIG. 2 is a plan view of a polarization holographic optical element (HOE) 17 according to an embodiment of the present invention that splits light and focuses the light onto the photodetector 10 of FIG. 1. Referring to FIG. 2, the polarization HOE 17 is divided into first through fourth (2 by 2) quadrants 17-1, 17-2, 17-3, and 17-4. In order to minimize the effect of shift in the focus of an objective lens, the first and fourth quadrants 17-1 and 17-4 and the second and third quadrants 17-2 and 17-3 split light passing through the objective lens into two parts in a radial direction so that the split light is incident on the second light-receiving portion 13 and the third light-receiving portion 15. The first and second quadrants 17-1 and 17-2 and the third and fourth quadrants 17-3 and 174 each split the incident light and generate positive and negative astigmatisms due to different focal lengths. A holographic pattern formed on the first and fourth quadrants 17-1 and 17-4 and a holographic pattern formed on the second and third quadrants 17-2 and 17-3 are bilaterally symmetrical. While spacing between the holographic patterns determines the amount of astigmatism generated in the plus and minus first-order beams, the curvature of the holographic patterns determines the intensities of the diffracted order beams. That is, the diffraction angle increases as the spacing between the holographic patterns decreases. As the curvature of the holographic patterns increases, the amount of astigmatism generated in the plus and minus first-order beams becomes greater than that of the zero-order beam.

Figure 3:
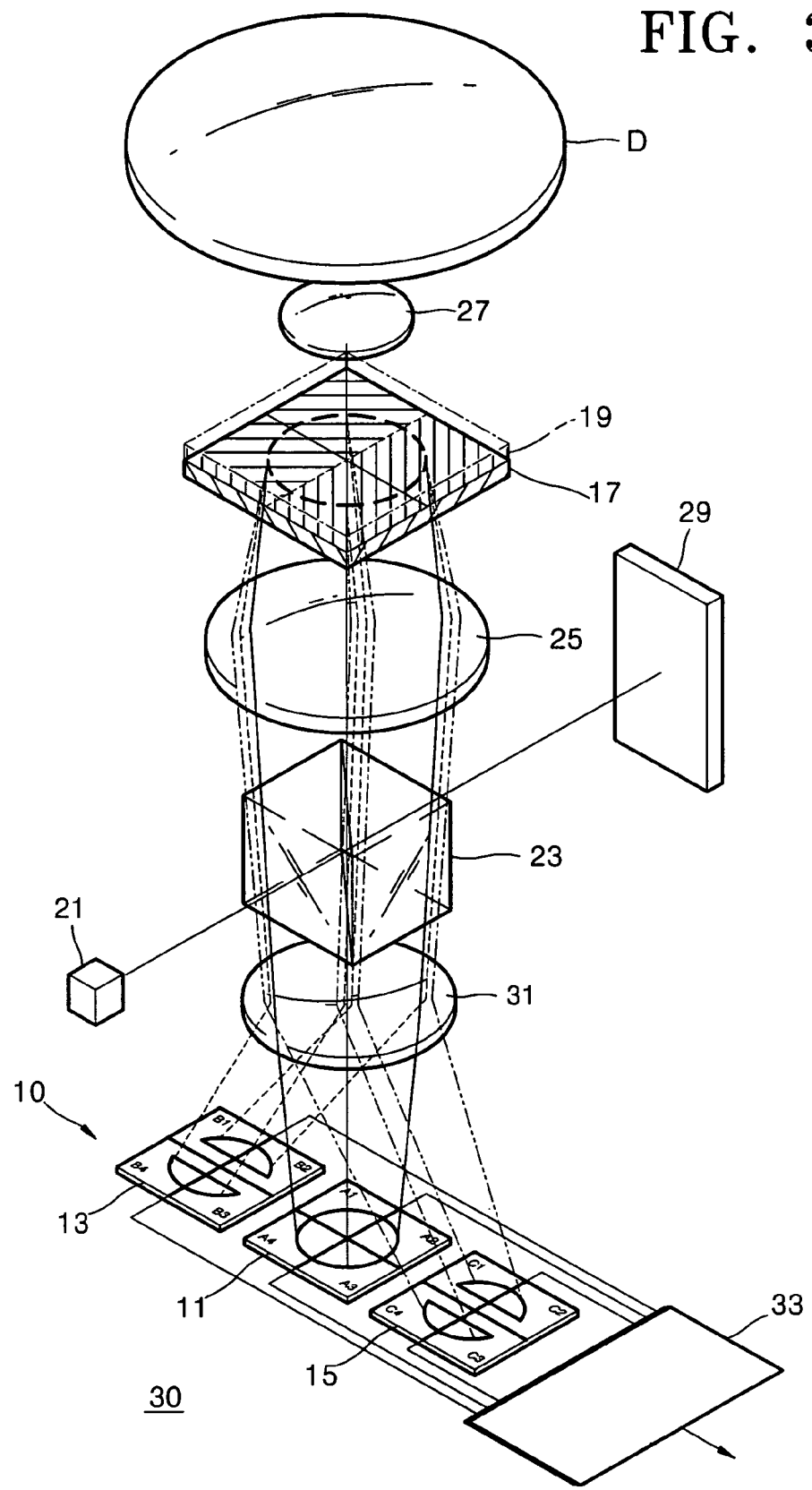
FIG. 3 is a schematic perspective view of an optical pickup according to an embodiment of the present invention.

FIG. 3 is a schematic perspective view of an optical pickup 30 according to an embodiment of the present invention. Referring to FIG. 3, the optical pickup 30 includes a light source 21 that generates a beam of light of a predetermined wavelength, an optical path changer 23 that splits light so that the light emitted by the light source 21 is incident on an optical disc D and light reflected from the optical disc D is incident on the photodetector 10, an objective lens 27 that focuses the light passing through the optical path changer 23 onto the optical disc D, a polarization HOE 17 that splits the light reflected from the optical disc D into different ordered diffracted beams, and the photodetector 10, which separates and receives the light passing through the polarization HOE 17 according to the diffraction order.

The optical pickup further includes a collimating lens 25 that is disposed along an optical path between the optical path changer 23 and the polarization HOE 17 and collimates the beam as it propagates toward the optical disc D into a parallel beam, a polarization converter 19 that preferably functions as a quarter wave retarder and retards the phase of an incident beam by one-quarter of a wavelength, a monitor photodetector 29 that receives light transmitted through the optical path changer 23 and detects the intensity of the light, and a concave lens 31 that is disposed in an optical path between the optical path changer 23 and the photodetector 10 so as to amplify astigmatism of light passing through the polarization HOE 17 into the photodetector 10.

When the optical disc D is a DVD disc, a laser diode (LD) emitting light with a 450 nm wavelength is preferably used as the light source 21 to record and/or reproduce information to and/or from the optical disc D.

The optical path changer 23 is a beam splitter that separates the path of the beam of irradiated from the light source 21 from the path of a beam reflected from the optical disc D. The optical path changer 23 may be a beam-shaping beam splitter that transforms an elliptical beam emitted by the light source 21 into a beam having a circular cross-section.

The polarization HOE 17 configured as shown in FIG. 2 preferably splits the beam reflected from the optical disc D into zero- and plus and minus first-order beams while generating positive and negative astigmatisms in the plus and minus first-order beams. The polarization HOE 17 preferably transmits a transversely polarized beam while reflecting a horizontally polarized beam. The transversely polarized beam transmitted through the polarization HOE 17 passes through the polarization converter 19 and is then reflected from the optical disc D back to the polarization converter 19. As the transversely polarized beam passes through the polarization converter 19 twice, the transversely polarized beam is converted into a horizontally polarized beam and is then incident on the polarization HOE 17. Thus, the horizontally polarized beam passes through the polarization HOE 17 to the photodetector 10.

The first through third light-receiving portions 11, 13, and 15 of the photodetector 10 respectively receive zero-order, and plus and minus first-order diffracted beams into which the beam reflected from the optical disc D is split by the polarization HOE 17. The beams received on the first through third light-receiving portions 11, 13, and 15 are photoelectrically converted into an electrical signal that is then sent to a servo error calculator 33. The servo error calculator 33 detects a focusing error signal (FES), a tracking error signal (TES), and a tilt error signal from the optical signals received by the first through third light-receiving portions 11, 13, and 15.

Equation (1) is used to calculate the FES using optical signals detected by the second light-receiving portion 13. As the distance between the objective lens 27 and the optical disc D increases, the size of the beams focused onto the quadrants B1 and B4 increases while the size of the beams focused onto the other two quadrants B2 and B3 decreases. When the distance between the objective lens 27 and the optical disc D increases, the intensity of the beams incident on the quadrants B1 and B4 is greater than intensity of the beams incident on the quadrants B2 and B3, and the FES obtained using Equation (1) has a positive value. Conversely, when the distance between the objective lens 27 and the optical disc D decreases, the FES has a negative value. The servo error calculator 33 calculates these values to control a focusing servo.

Similarly, Equations (2) and (3) are respectively used to calculate FESs using optical signals detected by the third light-receiving portion 15 and both the second and third light-receiving portions 13 and 15. Equation (3) provides a more accurate result than Equation (1) or (2) since it has a narrow range of error due to use of the sum of optical signals representing the plus and minus first-order beams (shown underlined):

$$FES=(\underline{B1+B4})-(\underline{B2+B3}) \quad (1)$$

$$FES=(\underline{C1+C4})-(\underline{C2+C3}) \quad (2)$$

$$FES=(\underline{B1+B4+C1+C4})-(\underline{B2+B3+C2+C3}) \quad (3)$$

Equation (4) is used to calculate the TES from an optical signal of the zero-order beam incident on the first light-receiving portion 11 using a conventional push-pull method. When the zero-order beam is focused on marks without a tracking error, there is no difference between the intensity of beams incident on the two quadrants A1 and A2 disposed on one side of the first light-receiving portion 11 in a radial direction and the intensity of beams incident on the two quadrants A3 and A4 disposed on the other side. That is, the difference between the sum of signals detected by the quadrants A1 and A2 and sum of signals detected by the quadrants A3 and A4 is zero. On the other hand, when a tracking error occurs, the TES in Equation (4) has positive or negative value since a beam spot shifts from the center:

$$TES=(A1+A2)-(A3+A4) \quad (4)$$

A tilt error signal is calculated using Equation (5), which is identical to Equation (4), when a beam spot is incident on lands or grooves:

$$\text{Tilt}=(A1+A2)-(A3+A4) \quad (5)$$

A tilt error that occurs when the optical disc D is inclined can be calculated by using the difference between the intensities of beams incident on inner and outer quadrants arranged in a radial direction of the photodetector 10. Thus, since there are differences between the intensities of beams incident on the inner and outer quadrants of the second and third light-receiving portions 13 and 15, tilt errors can alternatively be calculated using Equations (6) and (7):

$$\text{Tilt}=(B1+B2)-(B3+B4) \quad (6)$$

$$\text{Tilt}=(C1+C2)-(C3+C4) \quad (7)$$

Alternatively, the tilt error signal can be obtained using Equations (8) and (9) using beams selected from the optical beams incident on the first through third light-receiving portions 11, 13, and 15 shown in Equations (5)-(7), respectively:

$$\text{Tilt}=(B1+B2+C1+C2)-(B3+B4+C3+C4) \quad (8)$$

$$\text{Tilt}=(A1+A2+B1+B2+C1+C2)-(A3+A4+B3+B4+C3+C4) \quad (9)$$

Embodiments of the present invention provide a simple polarization HOE and a photodetector with a reduced number of sections, thus increasing the optical efficiency while improving the performance of recording and or reproducing information to and or from an optical disc by reducing the adjustment tolerances between components in an optical pickup. It is easier to control the optical pickup, thereby increasing productivity.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in descriptive sense only and should not be limiting.

What is claimed is:

1. An optical pickup that performs recording on or reproducing from an optical disc having lands and grooves in which information can be recorded to and/or reproduced from, the optical pickup comprising:

a light source;

an optical path changer for causing a beam emitted by the light source to propagate toward the optical disc;

an objective lens for focusing the beam incident from the optical path changer onto the optical disc;

a polarization holographic optical element (HOE) for splitting the beam reflected from the optical disc into diffracted beams; and a photodetector for photoelectrically converting diffracted beams, wherein the polarization HOE has a pattern designed to generate different astigmatisms in the left and right halves of the polarization HOE in a tangential direction and to divide plus and minus first-order beams in a radial direction, and the photodetector comprises a first light-receiving portion for receiving a zero-order beam and second and third light-receiving portions that are disposed on either side of the first light-receiving portion in the tangential direction and respectively receive the plus and minus first-order beams, wherein each of the first through third light-receiving portions is divided into four (2 by 2) sections.

2. The optical pickup of claim 1, wherein the polarization HOE has a bilaterally symmetrical oblique pattern.

3. The optical pickup of claim 1, wherein a tracking error signal is detected by photoelectrically converting a beam reflected from the optical disc and taking the difference between the sum of signals representing beams incident on two of the sections disposed on one side of the first light-receiving portion in the radial direction, and the sum of signals representing beams incident on two of the sections disposed on the other side of the first light-receiving portion.

4. The optical pickup of claim 1, wherein a focusing error signal is detected by photoelectrically converting a beam reflected from the optical disc and taking the difference between the sum of signals representing beams incident on two of the sections disposed on one side of the second light-receiving portion in the tracking direction, and the sum of signals representing beams incident on two of the sections disposed on the other side of the second light-receiving portion.

5. The optical pickup of claim 1, wherein a focusing error signal is detected by photoelectrically converting a beam reflected from marks formed on the optical disc and taking the difference between the sum of signals representing beams incident on two of the sections disposed on one side of the third light-receiving portion in the radial direction, and the sum of signals representing beams incident on two of the sections disposed on the other side of the third light-receiving portion.

6. The optical pickup of claim 1, wherein a focusing error signal is detected by photoelectrically converting a beam reflected from the optical disc and taking the difference between the sum of signals representing beams incident on two of the sections on one side of each of the second and third light-receiving portions in the tangential direction, and the sum of signals representing beams incident on the sections on the other side of each of the second and third light-receiving portions.

7. The optical pickup of claim 1, wherein a tilt error signal is detected by photoelectrically converting a beam reflected from lands or grooves formed on the optical disc and taking the difference between the sum of signals representing beams incident on two of the sections disposed on one side of the first light-receiving portion in the radial direction, and the sum of signals representing beams incident on two of the sections disposed on the other side of the first light-receiving portion.

8. The optical pickup of claim 1, wherein a tilt error signal is detected by photoelectrically converting a beam reflected from lands or grooves formed on the optical disc and taking the difference between the sum of signals representing beams incident on two of the sections on one side of the second light-receiving portion in the radial direction, and the sum of signals representing beams incident on two of the sections on the other side of the second light-receiving portion.

9. The optical pickup of claim 1, wherein a tilt error signal is detected by photoelectrically converting a beam reflected from lands or grooves formed on the optical disc and taking the difference between the sum of signals representing beams incident on two of the sections on one side of the third light-receiving portion in the radial direction, and the sum of signals representing beams incident on two of the sections disposed on the other side of the third light-receiving portion.

10. The optical pickup of claim 1, wherein a tilt error signal is detected by photoelectrically converting a beam reflected from lands or grooves formed on the optical disc and taking the difference between the sum of signals representing beams incident on two of the sections on one side of each of the second and third light-receiving portions in the radial direction, and the sum of signals representing beams incident on the sections on the other side of each of the second and third light-receiving portions.

11. The optical pickup of claim 1, wherein a tilt error signal is detected by photoelectrically converting a beam reflected from lands or grooves formed on the optical disc and taking the difference between the sum of signals representing beams incident on two of the sections on one side of each of the first through third light-receiving portions in the radial direction, and the sum of signals representing beams incident on the two sections on the other side of each of the first through third light receiving portions.

* * * * *